United States Patent [19]
Cuffaro et al.

[11] Patent Number: 5,983,185
[45] Date of Patent: Nov. 9, 1999

[54] METHOD AND DEVICE FOR SIMULTANEOUSLY RECORDING AND PRESENTING RADIO QUALITY PARAMETERS AND ASSOCIATED SPEECH

[75] Inventors: Angelo Cuffaro, Pierrefonds, Canada; Edward Wingrowicz, Kista, Sweden

[73] Assignee: Telefonaktiebolaget LM Ericsson (publ), Stockholm, Sweden

[21] Appl. No.: 08/948,898

[22] Filed: Oct. 10, 1997

[51] Int. Cl.$^6$ ............................. G10L 3/00; H04B 1/22
[52] U.S. Cl. ..................... 704/270; 455/423; 455/67.1
[58] Field of Search ..................... 704/270, 278; 348/192; 370/333; 375/224, 228; 324/612; 455/405, 423, 424, 425, 446, 67.1, 67.7, 115, 226.1, 412, 413

[56] References Cited

U.S. PATENT DOCUMENTS

| | | | |
|---|---|---|---|
| 5,121,342 | 6/1992 | Szymborski et al. | 395/200.54 |
| 5,490,204 | 2/1996 | Gulledge | 455/423 |
| 5,539,803 | 7/1996 | Bhat et al. | 379/21 |
| 5,644,623 | 7/1997 | Gulledge | 455/423 |
| 5,745,777 | 4/1998 | English et al. | 375/228 |

FOREIGN PATENT DOCUMENTS

| | | |
|---|---|---|
| 44 42 613 A1 | 6/1996 | Germany . |
| WO 95/33352 | 12/1995 | WIPO . |

OTHER PUBLICATIONS

"TQMS III and STARS User Manual" SOTOS Inc, p. 1–5 and 8–5, Nov. 1997.

So–Lin Yen and Hong–Kuang Hwang; "Intelligent MTS Monitoring System"; Proceedings of the International Carnahan Conference on Security Technology; 10–12–94; pp. 185–187.

Toshiaki Komizu, Ituo Hotta, Tutomu Ohnisi, Akio Maeda and Takeo Kontani; Development and Field Test Results of a Digital Cellular System in Japan; Proceedings of the Vehicular Technology Conference; 6–8–94; pp. 302–305.

*Primary Examiner*—David R. Hudspeth
*Assistant Examiner*—Harold Zintel
*Attorney, Agent, or Firm*—Smith & Danamraj, P.C.

[57] ABSTRACT

A system and method in a radio telecommunications network for correlating speech quality over an air interface link with a plurality of radio quality parameters. The system includes a mobile switching center (MSC) for recording uplink radio quality information from the air interface link, a mobile test tool for recording downlink radio quality information from the air interface link, a parser for parsing the radio quality information into the plurality of radio quality parameters, and a memory for storing the parsed radio quality information. A digital audio tape (DAT) recorder or personal computer (PC) is electronically connected to a mobile station for recording a speech conversation from the air interface link simultaneously with the recording of the radio quality information. A DAT-link interface is utilized to interface the DAT recorder with a playback unit and with a synchronizer/controller which synchronizes the stored radio quality information and the stored speech conversation. The radio quality parameters are presented to the operator in graphical form on a visual display while the speech conversation is simultaneously presented to the operator in audio form. The operator enters a subjective evaluation of the speech quality of the speech conversation, and the evaluation is correlated with the radio quality parameters and displayed on the visual display.

41 Claims, 4 Drawing Sheets

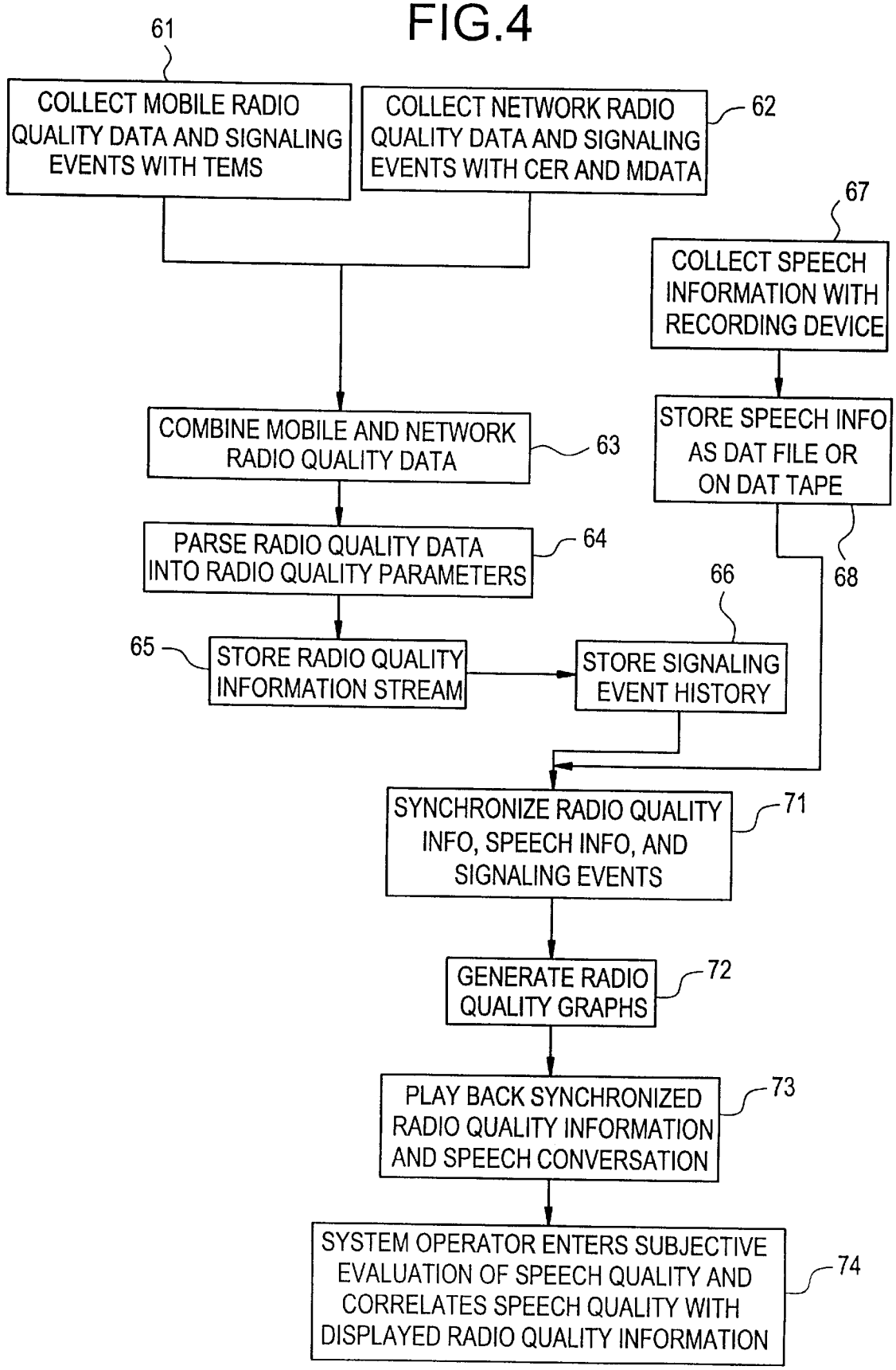

METHOD AND DEVICE FOR SIMULTANEOUSLY RECORDING AND PRESENTING RADIO QUALITY PARAMETERS AND ASSOCIATED SPEECH

BACKGROUND OF THE INVENTION

1. Technical Field of the Invention

This invention relates to cellular telecommunications network and, more particularly, to a system and method of evaluating the speech and radio quality of a telecommunications system.

2. Description of Related Art

Techniques exist in cellular telecommunications networks for gathering information relating to the radio quality of the air interface link between a base station and a mobile station. Various radio quality parameters such as Signal Strength (SS), Bit Error Rate (BER), Frame Erasure Rate (FER), Frequency Error (FRE), Time Alignment (TA), and mobile station Power Level (PL) have been utilized in attempts to identify parameters directly or indirectly impacting the speech quality on air interface links. However, systems for the analysis, organization, and presentation of this data to system operators have been lacking. Moreover, there has not been a system for directly correlating measured radio quality parameters with subjective evaluations of the speech quality of a particular air interface link.

Although there are no known prior art teachings of a solution to the aforementioned deficiency and shortcoming such as that disclosed herein, German Patent DE 4442613A1 to Peschel et al. discusses subject matter that bears some relation to matters discussed herein. Peschel discloses a mobile recording device which may be utilized to record signals over the air interface and generate values for the radio quality parameters. However, Peschel does not teach or suggest a system or method of analyzing, organizing, and presenting this data to system operators. Moreover, Peschel does not teach or suggest a system or method of directly correlating measured radio quality parameters with subjective evaluations of the speech quality of a particular air interface link.

Review of the foregoing reference reveals no disclosure or suggestion of a system or method such as that described and claimed herein.

In order to overcome the disadvantage of existing solutions, it would be advantageous to have a system and method of analyzing, organizing, and presenting to system operators, radio quality data from the air interface link. Such a system and method could also enable direct correlation of measured radio quality parameters with subjective evaluations of the speech quality of a particular air interface link. The present invention provides such a system and method.

SUMMARY OF THE INVENTION

In one aspect, the present invention is a system for presenting to a system operator, radio quality information from an air interface link between a mobile station and a base station in a radio telecommunications network. The system comprises means for recording radio quality information from the air interface link, means for parsing the radio quality information into a plurality of radio quality parameters, and means for visually presenting the plurality of radio quality parameters to the system operator. The system may also include means for displaying signaling events over the air interface link between the mobile station and the base station that transpired as the radio quality information was recorded, and means for correlating the signaling events with the radio quality parameters.

In another aspect, the present invention is a system in a radio telecommunications network for correlating speech quality over an air interface link with a plurality of radio quality parameters. The system includes a mobile switching center (MSC) for recording uplink radio quality information from the air interface link, a mobile test tool for recording downlink radio quality information from the air interface link, means for parsing the radio quality information into the plurality of radio quality parameters, and means for storing the parsed radio quality information. The system also includes a recording device such as an audio recorder or a personal computer (PC) electronically connected to a mobile station for recording a speech conversation from the air interface link simultaneously with the recording of the radio quality information, means for storing the recorded speech conversation, and means for synchronizing the stored radio quality information and the stored speech conversation. The system also includes means for presenting the radio quality parameters to the operator in graphical form on a visual display, and means for simultaneously presenting the speech conversation to the operator in audio form. The system may also include means for recording a subjective evaluation by the system operator of the speech quality of the recorded speech conversation, and means for correlating the subjective evaluation of the speech quality with the synchronized radio quality parameters.

In another aspect, the present invention is a method of correlating speech quality over an air interface link in a radio telecommunications network with a plurality of radio quality parameters. The method begins by recording radio quality information from the air interface link, and parsing the radio quality information into the plurality of radio quality parameters. Simultaneously, a speech conversation is recorded from the air interface link. This is followed by synchronizing the radio quality information and the speech conversation and simultaneously presenting the plurality of radio quality parameters and the recorded speech conversation to a system operator for correlation. The method may also include recording a subjective evaluation by the system operator of the speech quality of the recorded speech conversation, and correlating the subjective evaluation of the speech quality with the synchronized radio quality parameters.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 4 is a flow chart illustrating the steps of the method of the present invention.

DETAILED DESCRIPTION OF EMBODIMENTS

The Radio/Speech Quality Analyzer is a tool which visually presents radio quality information from an air interface link between a mobile station and a base station in a radio telecommunications network to a system operator. The radio quality information is collected and parsed into a plurality of radio quality parameters. The values of the parameters are graphed along a time axis and presented on a visual display. A historical record of signaling events is also created, and the events are correlated with times along the time axis.

Additionally, the quality analyzer enables a system operator to listen to a recorded speech conversation from a mobile telephone call while simultaneously viewing a display of radio quality parameters synchronized with the recorded speech conversation. In this manner, the operator is able to subjectively evaluate the speech quality of the mobile telephone call and directly identify radio quality parameters which are contributing to the achieved speech quality. The present invention is also useful as a pure radio quality analyzer through the graphic display of various radio quality parameters.

Figure 1:
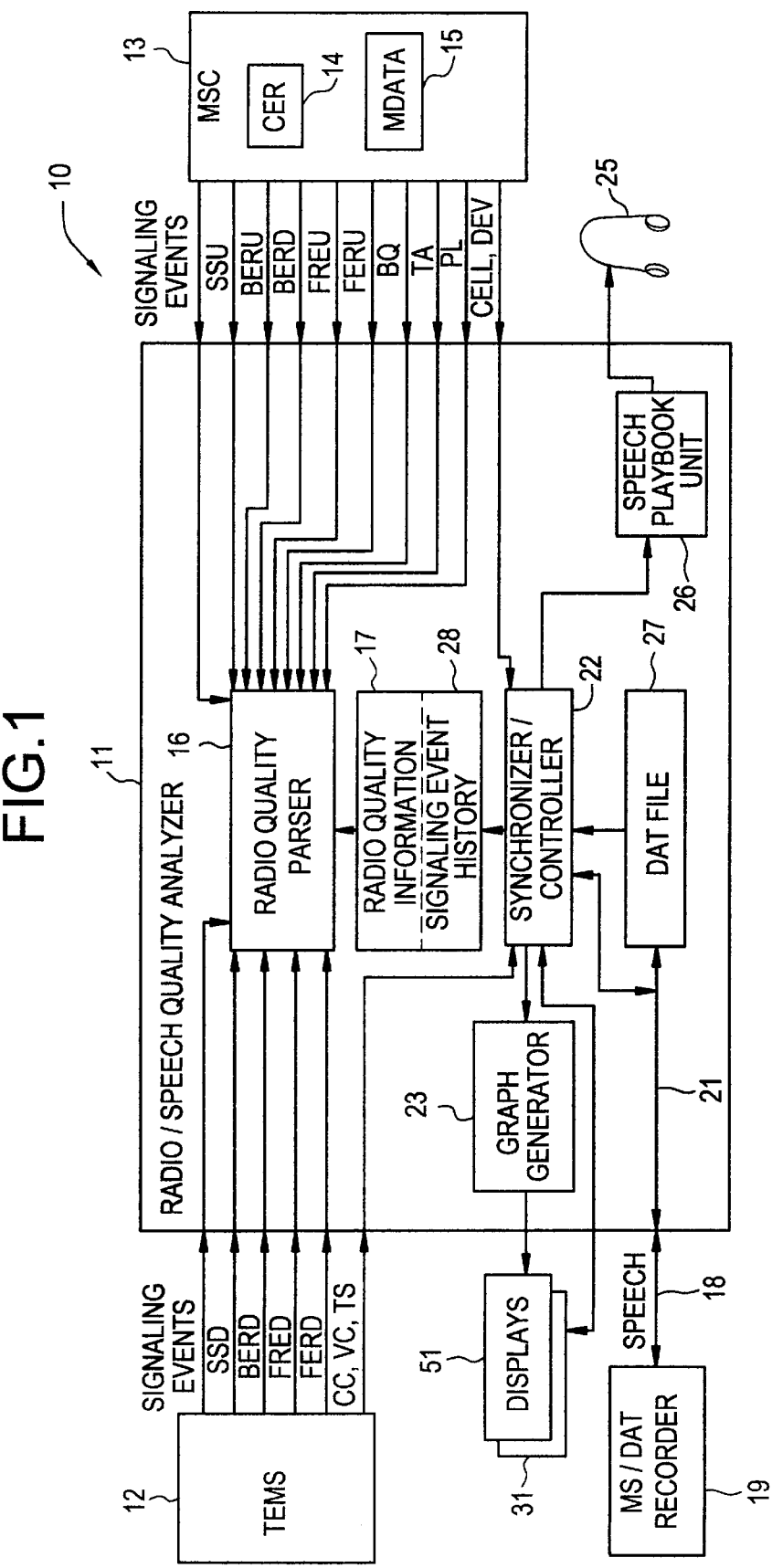
FIG. 1 is a block diagram of the preferred embodiment of the radio/speech quality analyzer of the present invention.

FIG. 1 is a block diagram of the preferred embodiment of the radio/speech quality analyzer system 10 of the present invention. A quality analyzer 11 gathers radio quality parameters from a Test Mobile System (TEMS) 12 and a Mobile Switching Center (MSC) 13. The TEMS 12 is a mobile tool which monitors the air interface link to its serving base station, and records all of the signaling on the uplink and the downlink. Software in the tool allows the recorded data to be downloaded to an attached personal computer for display and analysis. For example, the TEMS provides downlink radio quality information approximately every 0.5 seconds. Downlink BER is also provided by the MSC 13, but not as frequently (every 4–5 seconds).

The MSC includes two functions which also collect and report radio quality parameters. A Cell Event/Traffic Recording (CER) function 14 gathers information on a single call, or a few calls. An MDATA function 15 is a tool which utilizes triggers injected into the cellular system to generate and capture certain information. Information on all calls in the system is collected by the MDATA function.

The radio quality parameters collected and analyzed by the quality analyzer may include, for example:

| Parameter | Value Range | Source |
| --- | --- | --- |
| Signal Strength Uplink (SSU); | 0–63 | MSC |
| Signal Strength Downlink (SSD); | 0–63 | TEMS/MSC |
| Bit Error Rate Class Uplink (BERU); | 0–7 | MSC |
| Bit Error Rate Class Downlink (BERD); | 0–7 | TEMS/MSC |
| Frequency Error Uplink (FREU); | −800 to +800 Hz | MSC |
| Frame Erasure Rate Uplink (FERU); | 0–26 | MSC |
| Frame Erasure Rate Downlink (FERD); | 0–26 | TEMS |
| Burst Quality (BQ); | 0–100 | MSC |
| Time Alignment; and | 0–30 | TEMS/MSC |
| Mobile Power Level (PL). | 0–10 | MSC |

The system operator may choose to display all, or a selected subset, of the radio quality parameters. Methods of calculating the values of each individual radio quality parameter are well known to those skilled in the cellular telecommunications art, and need not be discussed further herein.

Information regarding the mobile station control channel (CC), voice channel (VC), and time slot (TS) is sent from the TEMS 12 to a synchronizer/controller 22. Information regarding the current cell (CELL) and device (DEV) is sent from the serving MSC 13 to the synchronizer/controller.

Mobile station downlink radio quality data from the TEMS 12 is combined with the primarily uplink CER and MDATA radio quality data from the MSC 13. Then the data is parsed in a radio quality parser 16 and placed into a single stream which is recorded as radio quality information 17. This provides a recording of the radio quality on both the uplink and the downlink. Signaling event information included in the data from the TEMS and the CER is placed in a historical record of signaling events 28. Speech information 18 is recorded by a recording device such as, for example a digital audio tape (DAT) recorder or a personal computer (PC) electronically connected via a digital interface to a mobile station (MS/DAT recorder 19). The mobile station is modified to provide the digital speech at this interface connection point. This reduces any loss or distortions of voice signals received by the mobile station that may arise if the recording is made from the analog signal provided to the mobile station speaker. In the preferred embodiment, the MS/DAT recorder 19 is connected to the quality analyzer 11 through a DAT-link interface 21. This enables the synchronizer/controller 22 to automatically synchronize the playback of the speech conversation 18 with the radio quality information 17 and signaling event history 28. The system operator can also stop and start the MS/DAT recorder 19 through the DAT-link interface.

If the system configuration does not include a DAT-link interface, the playback of the speech conversation 18, the radio quality information 17, and the signaling events is synchronized manually. A sound header is placed at the beginning of the speech information for manual synchronization of the speech conversation and the radio quality information. The radio quality information and the signaling events are reported together from the TEMS 12 and the CER 14, and are automatically time-synchronized. The sound header is time-stamped, and this time is indicated on the canvas of a radio quality display 51 (FIG. 3) so that the display 51 can be started simultaneously with the sound header. Automatic synchronization of the speech conversation is performed in essentially the same manner by the synchronizer/controller 22.

Figure 2:
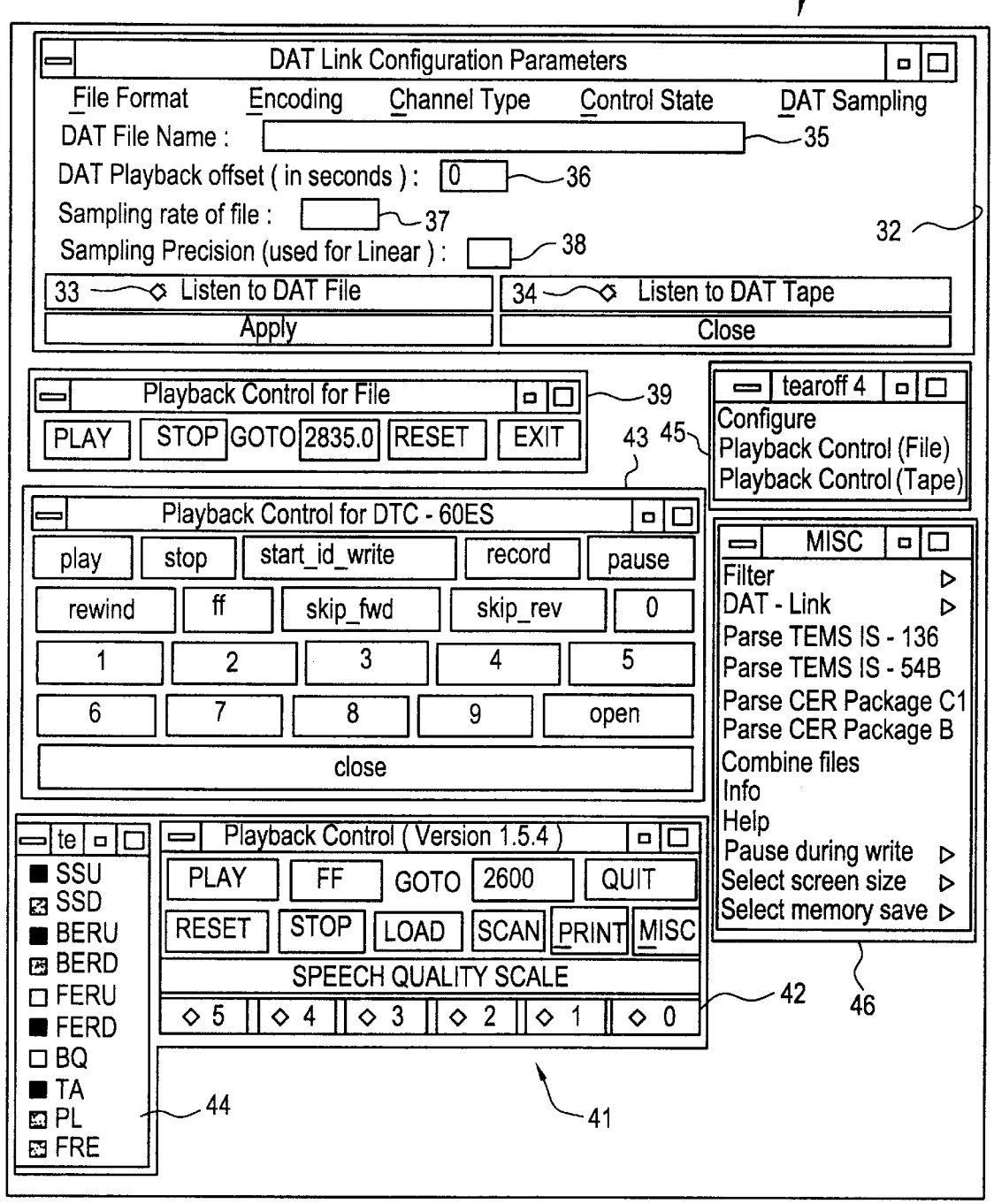
FIG. 2 is an illustration of an exemplary interactive graphic display window through which a system operator may control the system of the present invention.

The quality analyzer 11 continually gathers information on various radio quality parameters from the recorded radio quality information 17. This information is placed into graphical form by a graph generator 23 and presented on the radio quality display 51 to a system operator on a standard workstation or personal computer. The speech conversation is played back to the operator at an audio station 25 by a speech playback unit 26. The speech playback unit obtains the speech information either from a tape in the MS/DAT recorder 19 or from memory in a DAT file 27. The system operator controls the quality analyzer 11 through an interactive graphic display window 31 (FIG. 2). In an exemplary embodiment, the quality analyzer compares the radio quality parameter information with the subjective evaluation of the speech quality entered by the operator once every second. At the end of the recording, the quality analyzer generates summary statistics regarding the quality of the speech, and the correlation of various parameters with good or bad evaluations of speech quality.

FIG. 2 is an illustration of an exemplary interactive graphic display window 31 through which the system operator may control the system of the present invention. Window 31 emulates the controls of a playback device, providing mouse and keyboard controls through which the operator controls the playback of the recorded speech conversation and the presentation of the synchronized radio quality parameters. A first section 32 enables the operator to control DAT-link configuration parameters. A first button 33 is utilized to select a DAT file for playback of the recorded speech conversation. A second button 34 is utilized to select a DAT tape for playback. A DAT file name may be entered in box 35. Other parameters may be entered in boxes labeled, for example, DAT playback offset (in seconds) 36, Sampling rate of file 37, and Sampling precision (used for Linear) 38.

A second section 39 includes playback controls for the synchronized playback of the DAT file 27 (FIG. 1). Four (4) keyboard buttons are provided: Play, Stop, Reset, and Exit. In addition, a GOTO window enables the operator to enter a specific time value for the playback to begin.

Playback controls for the synchronized playback of the DAT tape are included in section 41. Nine (9) keyboard buttons are provided: Play, Fast Forward (FF), Quit, Reset, Stop, Load, Scan, Print, and Miscellaneous (Misc). Additionally, the system operator may enter a time in a GOTO window. This causes the quality analyzer to begin playback at the designated time. A speech quality scale 42 enables the operator to indicate his subjective evaluation of the speech quality of the recorded speech conversation. The exemplary speech quality scale illustrated in FIG. 2 utilizes a decreasing speech quality scale from 5 (excellent) to 0 (Very poor or none).

A third section 43 provides the operator with direct playback control of the MS/DAT recorder 19 (FIG. 1) through the DAT-link interface 21. With the controls in section 43, the operator can play and manuever the DAT tape independently of the playback of the radio quality parameters. For example, the operator can locate a particular point on the DAT tape, before beginning synchronized playback, in order to manually synchronize the speech conversation 18 with the radio quality information 17.

Figure 3:
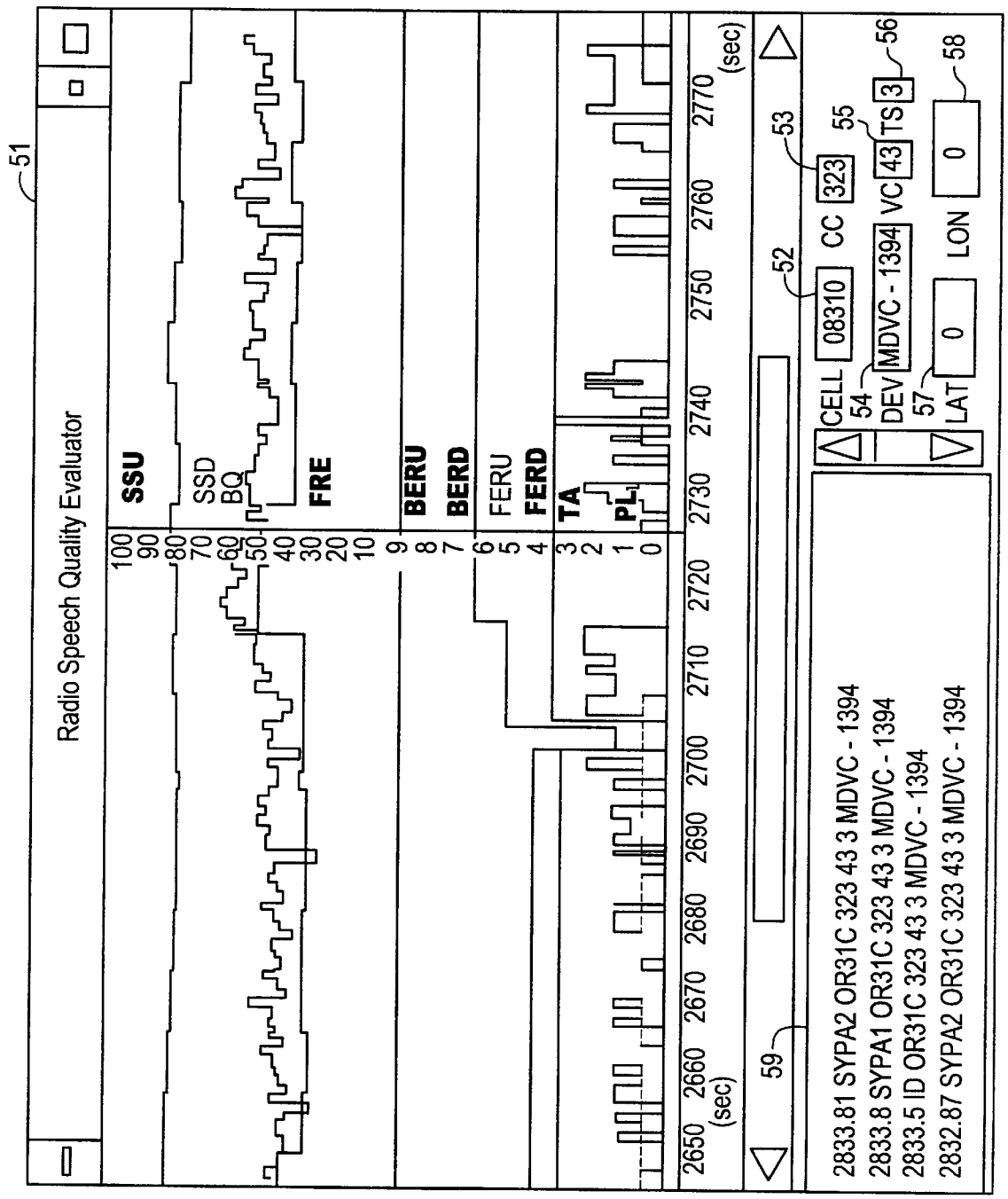
FIG. 3 is an illustration of an exemplary graphic display window illustrating various radio quality parameters in graphical form.

A fourth section 44 lists the radio quality parameters that are available and/or selected for display on the canvas of FIG. 3. The operator may select all or a subset of parameters for display.

A fifth section 45 provides the operator with an overall menu of the functions performed for the DAT link 21, and a sixth section 46 provides the operator with a menu of various miscellaneous functions which are described in more detail below.

When utilizing the interactive display of FIG. 2, the operator listens to the speech conversation recorded over the air interface between the base station and the MS/DAT recorder 19 (FIG. 1), and evaluates the speech quality. He simultaneously enters his subjective evaluation utilizing the speech quality scale 42. The quality analyzer 11 samples the operator evaluation every second, and instantly places the evaluation on the graphical display window of FIG. 3.

FIG. 3 is an illustration of an exemplary graphic display window 51 illustrating various radio quality parameters in graphical form. The radio quality parameters are displayed on a canvas presenting, for example, a line graph of each parameter. The X-axis is a time scale in seconds, and the Y-axis represents the current values of each of the various radio quality parameters. Also displayed is the current cell (Cell) 52, control channel (CC) 53, device (Dev) 54; voice channel (VC) 55, and time slot (TS) 56 that the mobile station is currently utilizing. The current latitude 57 and longitude 58 of the mobile station's position may also be displayed. The current cell information 52 and the device 54 are acquired from the CER function 14 in the MSC 13. The control channel 53, voice channel 55, and time slot 56 are acquired from the TEMS 12.

A scrolling list 59 of the raw data that is collected from the TEMS 12 and the MSC 13 is also displayed. The values of the radio quality parameters are used to draw the line graphs. The raw data also includes an indication of the various signaling events over the air interface that transpired as the radio quality data was recorded. These events are time-correlated with the radio quality parameters that are currently being displayed on the canvas, as well as the speech conversation playback. The following is an exemplary list of events that may be identified and displayed in the scrolling list 59 along with an indication of the source from which the event indication is received.

| Event | Source |
| --- | --- |
| Originating Access (OA) | CER |
| Page Response Access (PRA) | CER |
| Digital Handoff Request (DHR) | CER |
| Radio Quality Message (RQM) | CER |
| Handoff Attempt (HA1) | CER |
| Handoff Result (HA2) | CER |
| Voice Channel Seizure (VS) | CER |
| Handoff Order (HA) | TEMS |
| Dedicated Channel Statistics (DE) | TEMS |
| Physical Layer Control (PHLACO) | TEMS |
| Physical Layer Control Ack (PHLACOAC) | TEMS |
| Measurement Order (MEOR) | TEMS |
| Measurement Order Ack (MEORAC) | TEMS |
| Handoff (HA) | TEMS |
| Page Response (PARE) | TEMS |
| Origination (OR) | TEMS |
| Release DTC (RE-DT) | TEMS |
| Sat Fade Status (SAFAST) | TEMS |
| Change Power Level (CHPOLE) | TEMS |
| Order Confirmation (ORCO) | TEMS |
| DTC Assignment (DTAS) | TEMS |
| Base Station Acknowledge (BASTAC) | TEMS |
| Mobile Acknowledge (MOAC) | TEMS |
| Audio State (AUST) | TEMS |
| Idle (ID) | TEMS |
| System Parameter 1 (SYPA1) | TEMS |
| System Parameter 2 (SYPA2) | TEMS |
| Registration Increment (REIN) | TEMS |
| Registration ID (REID) | TEMS |
| Registration (RE) | TEMS |
| Registration Acknowledge (REAC) | TEMS |
| Control Filler (COFI) | TEMS |

Referring to FIGS. 1–3, the operation of the quality analyzer of the present invention will now be described. Selecting the Load button in section 41 of FIG. 2 loads an ASCII file of radio quality information from the memory 17 into the synchronizer/controller 22. Selecting the Play button of section 41 causes the quality analyzer to begin drawing the radio quality line graphs on the canvas of FIG. 3. The line graphs are normally drawn in actual time, at the same rate that the speech conversation was recorded. If FF is selected while the Play button is activated, the canvas window is updated at ten times the normal rate. If FF is selected when the playback is stopped, the canvas window is updated at 500 times the normal rate. Selecting the Stop button in section 41 stops the playback, while the Reset button causes the screen to be erased and the playback position to be reset to the start of the ASCII file. A time value may be typed into the GOTO window to cause the canvas to be written starting at the designated time.

Selection of the Print button in section 41 presents a menu with 6 items. The first item causes the contents of the current canvas to be printed to a postscript file. The entire recorded canvas can be printed for later analysis. The second item causes the current canvas as well as any canvas history to be printed. The third item prints the raw data from the parameter graphs to an ASCII file. The fourth item prints summary statistics of the whole radio quality ASCII file and of the portion of the file that has already been played back. The statistics are printed to a statistics ASCII file. Selection of the fifth item prints all of the above items. The sixth item is utilized to clear an internal postscript file generated during a "memory save" operation.

Selection of the Misc button in section 41 presents the menu 46. The first item provides a mechanism for excluding various line graphs from the canvas. The second item establishes the DAT-link. The next five items are used to generate the radio quality information file 17. The third and fourth items parse radio quality data recorded from the TEMS 12 and save it in a TEMS file. The fifth and sixth items on the Misc menu parse radio quality data recorded in the serving MSC 13 utilizing the CER function 14, and save it to a CER file. The seventh item on the Misc menu synchronizes and combines the parsed TEMS and CER files to form the radio quality information stream 17. The eighth item is an Info file for documentation on the quality analyzer system. The ninth item is a Help file which describes the procedures for system operation for the system operator. The tenth item is a "Pause During Write" item which causes the writing of a new canvas (FIG. 3) to begin only after the old canvas has been dumped. When this item is selected, the Stop button and the Play button turn red. If a DAT recorder is being utilized, and a DAT-link is not configured, the operator must pause the DAT recorder at this point utilizing the Pause button in section 43, (i.e., if manual synchronization of radio quality and speech playback is being performed). When the playback continues, the Stop and the Play buttons turn green, and the new canvas is started from the beginning. If the Pause During Write item is not selected, the playback of the new canvas continues during the dumping of the old canvas to disk. However, the radio quality graphs are not displayed until dumping is complete. When the graphs are again displayed, they are continued at the actual time rather than the beginning of the new canvas (i.e., there is no pause). The eleventh item is a "Select Screen Size" item which provides the capability to select a larger sized canvas for large displays. The twelfth item is a "Select Memory Save" item which is used to dump the current canvas to disk every four canvas frames (8 minutes). The canvas is then reset and continues to refresh where it left off.

If the operator workstation or personal computer is equipped with a DAT-link interface 21, the playback of the radio quality parameters may be automatically synchronized with the playback of the recorded speech conversation. The preferred embodiment provides two options for synchronized playback. In the first option, playback of the recorded speech information is performed from a DAT tape in the MS/DAT recorder 19. In the second option, playback of the recorded speech information is performed from the file 27 located on the operator workstation or personal computer. By default, the option is set to playback from the file. If the first option is selected, then a DAT recorder with a remote control interface is required. The DAT recorder is automatically paused by the control program whenever the playback of the radio quality parameters is paused. If the second option is selected, then an audio file is played and paused automatically by the synchronizer/controller 22. The file may be created by a DAT recorder or by a PC digitally interfaced with the mobile station.

FIG. 4 is a flow chart illustrating the steps of the method of the present invention. At step 61, mobile station radio quality data and event signaling data are collected utilizing the TEMS 12. The data may include radio quality information such as downlink SS, BER, FRE, and FER. At 62, network radio quality data and signaling event data are collected utilizing the CER function 14 and the MDATA function 15 in the serving MSC 13. The radio quality data may include uplink SS, BER, FRE, and FER, downlink BER, and BQ, TA, and PL. At step 63, the mobile station and network radio quality data is combined. At 64, the combined data is parsed into radio quality parameters and sent as a stream to a radio quality information file 17 where the information is stored in step 65. A historical record 28 of signaling events and associated times is created at 66.

Step 67 shows that the quality analyzer also collects speech information with, for example, a MS/DAT recorder 19 or a PC digitally interfaced with the mobile station. The speech information is then stored on a DAT tape or as a file in step 68. At step 71, the recorded radio quality information, the speech information, and the signaling events are synchronized by the synchronizer/controller 22. If the system configuration does not include a DAT-link interface 21, the synchronization of the speech information with the radio quality and event information may be performed by the system operator utilizing the time-stamped sound header. At 72, line graphs of the radio quality parameters versus time are generated, and at step 73, the synchronized radio quality information and speech information are played back on the canvas 51 of FIG. 3 and through the audio station 25, respectively. At 74, the system operator enters his subjective evaluation of the speech quality of the mobile telephone call, and directly correlates displayed radio quality parameters which are contributing to the achieved speech quality.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a radio telecommunications network, a method of simultaneous presentation of radio quality parameters and speech quality over an air interface link, said method comprising the steps of:

recording radio quality information from the air interface link;

parsing the radio quality information into a plurality of radio quality parameters;

recording a speech conversation from the air interface link, said speech conversation recording step being performed simultaneously with the radio quality information recording step; and simultaneously presenting the plurality of radio quality parameters and the recorded speech conversation to a system operator.

2. The method of simultaneous presentation of radio quality parameters and speech quality over an air interface link of claim 1 wherein the step of simultaneously presenting the plurality of radio quality parameters and the recorded speech conversation to a system operator includes the steps of:

storing the plurality of radio quality parameters and the speech conversation; and synchronizing the stored plurality of radio quality parameters and the stored speech conversation.

3. The method of simultaneous presentation of radio quality parameters and speech quality over an air interface link of claim 1 wherein the step of simultaneously presenting the plurality of radio quality parameters and the recorded speech conversation to a system operator includes the steps of:

presenting the radio quality parameters to the operator in visual form; and simultaneously presenting the speech conversation to the operator in audio form.

4. The method of simultaneous presentation of radio quality parameters and speech quality over an air interface link of claim 3 wherein the step of presenting the radio quality parameters to the operator in visual form includes the steps of:

generating graphs of the radio quality parameters; and presenting the graphs to the operator on a graphical display.

5. The method of simultaneous presentation of radio quality parameters and speech quality over an air interface link of claim 1 wherein the step of recording radio quality information from the air interface link includes recording downlink radio quality information with a mobile testing tool.

6. The method of simultaneous presentation of radio quality parameters and speech quality over an air interface link of claim 5 wherein the step of recording downlink radio quality information with a mobile testing tool includes recording downlink signal strength and bit error rate.

7. The method of simultaneous presentation of radio quality parameters and speech quality over an air interface link of claim 6 wherein the step of recording downlink radio quality information with a mobile testing tool includes recording downlink frame erasure rate and frequency error.

8. The method of simultaneous presentation of radio quality parameters and speech quality over an air interface link of claim 1 wherein the step of recording radio quality information from the air interface link includes recording uplink radio quality information in a serving mobile switching center (MSC).

9. The method of simultaneous presentation of radio quality parameters and speech quality over an air interface link of claim 8 wherein the step of recording uplink radio quality information in a serving mobile switching center (MSC) includes recording uplink signal strength and bit error rate.

10. The method of simultaneous presentation of radio quality parameters and speech quality over an air interface link of claim 9 wherein the step of recording uplink radio quality information in a serving mobile switching center (MSC) includes recording uplink frame erasure rate and frequency error.

11. The method of simultaneous presentation of radio quality parameters and speech quality over an air interface link of claim 1 wherein the step of recording radio quality information from the air interface link includes recording burst quality, time alignment, and power level in a serving mobile switching center (MSC).

12. The method of simultaneous presentation of radio quality parameters and speech quality over an air interface link of claim 1 wherein the step of recording a speech conversation from the air interface link includes the steps of:

interfacing a recording device with a mobile station; and recording the speech conversation with the recording device.

13. The method of simultaneous presentation of radio quality parameters and speech quality over an air interface link of claim 12 wherein the step of interfacing a recording device with a mobile station includes interfacing a digital audio tape (DAT) recorder with the mobile station.

14. The method of simultaneous presentation of radio quality parameters and speech quality over an air interface link of claim 12 wherein the step of interfacing a recording device with a mobile station includes digitally interfacing a personal computer (PC) with the mobile station.

15. In a radio telecommunications network, a method of simultaneous presentation of radio quality parameters and speech quality over an air interface link, said method comprising the steps of:

obtaining radio quality information from a mobile test tool and from a serving mobile switching center (MSC);

parsing the radio quality information into radio quality parameters;

storing the radio quality parameters;

simultaneously recording a speech conversation associated with the radio quality information;

storing the speech conversation;

synchronizing the stored radio quality parameters and the stored speech conversation; and simultaneously presenting the synchronized radio quality parameters and the speech conversation to a system operator.

16. The method of simultaneous presentation of radio quality parameters and speech quality over an air interface link of claim 15 further comprising the steps of:

recording a subjective evaluation of the speech quality of the recorded speech conversation, said evaluation being made by the system operator; and simultaneously presenting to the system operator, the subjective evaluation of the speech quality with the synchronized radio quality parameters and the speech conversation.

17. In a radio telecommunications network, a method of simultaneous presentation of radio quality parameters and speech quality over an air interface link, said method comprising the steps of:

recording downlink radio quality information from the air interface link with a mobile testing tool;

recording uplink radio quality information from the air interface link in a serving mobile switching center (MSC);

simultaneously recording a speech conversation from the air interface link, with an audio recorder interfaced with a mobile station;

parsing the radio quality data into a plurality of radio quality parameters;

storing the radio quality parameters;

storing the speech conversation;

synchronizing the recorded radio quality parameters and the recorded speech conversation;

generating graphs of the radio quality parameters;

presenting the graphs to the operator on a graphical display; and simultaneously presenting the speech conversation to the operator in audio form.

18. The method of simultaneous presentation of radio quality parameters and speech quality over an air interface link of claim 17 further comprising the steps of:

recording a subjective evaluation of the speech quality of the recorded speech conversation, said evaluation being made by the system operator; and simultaneously presenting to the system operator, the subjective evaluation of the speech quality with the synchronized radio quality parameters and the speech conversation.

19. A system in a radio telecommunications network for simultaneous presentation of radio quality parameters and speech quality over an air interface link, said system comprising:

means for recording radio quality information from the air interface link;

means for parsing the radio quality information into a plurality of radio quality parameters;

means for recording a speech conversation from the air interface link simultaneously with the recording of the radio quality information; and means for simultaneously presenting the plurality of radio quality parameters and the recorded speech conversation to a system operator.

20. The system for simultaneous presentation of radio quality parameters and speech quality over an air interface link of claim 19 wherein said means for recording radio quality information from the air interface link includes:

means for recording uplink information; and means for recording downlink information.

21. The system for simultaneous presentation of radio quality parameters and speech quality over an air interface link of claim 20 wherein said means for recording uplink information is a serving mobile switching center (MSC).

22. The system for simultaneous presentation of radio quality parameters and speech quality over an air interface link of claim 20 wherein said means for recording downlink information is a mobile test tool.

23. The system for simultaneous presentation of radio quality parameters and speech quality over an air interface link of claim 19 wherein said means for recording a speech conversation from the air interface link includes a personal computer (PC) digitally interfaced with a mobile station.

24. The system for simultaneous presentation of radio quality parameters and speech quality over an air interface link of claim 19 wherein said means for recording a speech conversation from the air interface link includes a digital audio tape (DAT) recorder electronically connected to a mobile station.

25. The system for simultaneous presentation of radio quality parameters and speech quality over an air interface link of claim 23 further comprising:

means for storing the parsed radio quality information; and means for storing the recorded speech conversation.

26. The system for simultaneous presentation of radio quality parameters and speech quality over an air interface link of claim 25 further comprising means for synchronizing the stored radio quality information and the stored speech conversation prior to presenting the information to the operator.

27. The system for simultaneous presentation of radio quality parameters and speech quality over an air interface link of claim 26 further comprising a DAT-link interface for interfacing the DAT recorder with the storing means for the speech conversation and with the synchronizing means.

28. The system for simultaneous presentation of radio quality parameters and speech quality over an air interface link of claim 19 wherein said means for simultaneously presenting the plurality of radio quality parameters and the recorded speech conversation to a system operator includes:

means for presenting the radio quality parameters to the operator in visual form; and means for simultaneously presenting the speech conversation to the operator in audio form.

29. The system for simultaneous presentation of radio quality parameters and speech quality over an air interface link of claim 28 wherein said means for presenting the radio quality parameters to the operator in visual form includes:

a graph generator for generating graphs from the stored radio quality information; and a graphical display for visually presenting the graphs to the operator.

30. The system for simultaneous presentation of radio quality parameters and speech quality over an air interface link of claim 29 wherein said means for simultaneously presenting the speech conversation to the operator in audio form includes:

means for storing the recorded speech conversation;

means for retrieving the stored speech conversation;

an audio station for playing the speech conversation to the operator; and means for synchronizing the graphical display with the audio speech conversation.

31. The system for simultaneous presentation of radio quality parameters and speech quality over an air interface link of claim 30 further comprising:

means for recording a subjective evaluation of the speech quality of the recorded speech conversation, said evaluation being made by the system operator; and means for simultaneously presenting to the system operator, the subjective evaluation of the speech quality with the synchronized radio quality parameters and the speech conversation.

32. A system in a radio telecommunications network for simultaneous presentation of radio quality parameters and speech quality over an air interface link, said system comprising:

a mobile switching center (MSC) for recording uplink radio quality information from the air interface link;

a mobile test tool for recording downlink radio quality information from the air interface link;

means for parsing the radio quality information into a plurality of radio quality parameters;

means for storing the parsed radio quality information;

a recording device electronically connected to a mobile station for recording a speech conversation from the air interface link simultaneously with the recording of the radio quality information;

means for storing the recorded speech conversation;

means for synchronizing the stored radio quality information and the stored speech conversation;

means for presenting the radio quality parameters to the operator in graphical form on a visual display; and means for simultaneously presenting the speech conversation to the operator in audio form.

33. The system for simultaneous presentation of radio quality parameters and speech quality over an air interface link of claim 32 further comprising:

means for recording a subjective evaluation of the speech quality of the recorded speech conversation, said evaluation being made by the system operator; and means for simultaneously presenting to the system operator, the subjective evaluation of the speech quality with the synchronized radio quality parameters and the speech conversation.

34. A system for presenting to a system operator, radio quality information from an air interface link between a mobile station and a base station in a radio telecommunications network, said system comprising:

means for recording radio quality information and signaling events that affect radio quality from the air interface link;

means for parsing the radio quality information into a plurality of radio quality parameters, the parameters including signal strength, bit error rate, and frame erasure rate; and means for visually presenting the plurality of radio quality parameters to the system operator.

35. The system for presenting radio quality information to a system operator of claim 34 further comprising:

means for creating a historical record of the signaling events over the air interface link between the mobile station and the base station, the signaling events including handoff attempts and change power level messages; and means for simultaneously presenting to the system operator, the signaling events with the radio quality parameters.

36. The system for presenting radio quality information to a system operator of claim 34 wherein said means for visually presenting the plurality of radio quality parameters to the system operator includes:

a graph generator for generating graphs from the plurality of radio quality parameters, said graphs showing values of the radio quality parameters on a first axis, and time on a second axis; and a graphical display for visually presenting the graphs to the operator.

37. The system for presenting radio quality information to a system operator of claim 36 further comprising:

means for creating a historical record of signaling events over the air interface link between the mobile station and the base station, the signaling events including handoff attempts and change power level messages; and means for presenting to the system operator, the signaling events at their time of occurrence on the second axis of the radio quality parameter graphs.

38. In a radio telecommunications network, a method of presenting to a system operator, radio quality information from an air interface link between a mobile station and a base station in a radio telecommunications network, said method comprising the steps of:

recording radio quality information and signaling events that affect radio quality from the air interface link;

parsing the radio quality information into a plurality of radio quality parameters, the parameters including signal strength, bit error rate, and frame erasure rate; and visually presenting the plurality of radio quality parameters to the system operator.

39. The method of presenting radio quality information to a system operator of claim 38 further comprising the steps of:

creating a historical record of the signaling events over the air interface link between the mobile station and the base station, the signaling events including handoff attempts and change power level messages; and simultaneously presenting to the system operator, the signaling events with the radio quality parameters.

40. The system for presenting radio quality information to a system operator of claim 38 wherein said step of visually presenting the plurality of radio quality parameters to the system operator includes:

generating graphs from the plurality of radio quality parameters, said graphs showing values of the radio quality parameters on a first axis, and time on a second axis; and visually presenting the graphs to the operator on a graphical display.

41. The method of presenting radio quality information to a system operator of claim 40 further comprising the steps of:

creating a historical record of the signaling events over the air interface link between the mobile station and the base station, the signaling events including handoff attempts and change power level messages; and presenting to the system operator, the signaling events at their time of occurrence on the second axis of the radio quality parameter graphs.

* * * * *